United States Patent
Hirakawa et al.

(10) Patent No.: US 8,969,277 B2
(45) Date of Patent: Mar. 3, 2015

(54) MANUFACTURING METHOD OF A GLASS SUBSTRATE FOR A MAGNETIC DISK

(75) Inventors: Takuhiro Hirakawa, Tokyo (JP); Yasunari Hirano, Tokyo (JP); Kouichi Tamoto, Tokyo (JP); Tomoyuki Yamaguchi, Tokyo (JP)

(73) Assignee: Hoya Corporation, Tokyo (JP)

( * ) Notice: Subject to any disclaimer, the term of this patent is extended or adjusted under 35 U.S.C. 154(b) by 164 days.

(21) Appl. No.: 13/380,234

(22) PCT Filed: Mar. 31, 2011

(86) PCT No.: PCT/JP2011/058325
§ 371 (c)(1),
(2), (4) Date: Apr. 9, 2012

(87) PCT Pub. No.: WO2011/125895
PCT Pub. Date: Oct. 13, 2011

(65) Prior Publication Data
US 2012/0190606 A1 Jul. 26, 2012

(30) Foreign Application Priority Data

Mar. 31, 2010 (JP) ................................ 2010-082453

(51) Int. Cl.
*C11D 7/60* (2006.01)
*G11B 5/84* (2006.01)
*C03C 23/00* (2006.01)

(52) U.S. Cl.
CPC .......... *G11B 5/8404* (2013.01); *C03C 23/0075* (2013.01)
USPC ........................................................ 510/179

(58) Field of Classification Search
CPC .. C03C 23/0075; C03C 17/00; C03C 17/009; B08B 11/04; G11B 5/8404
USPC ......... 510/179, 181, 161, 219, 393, 398, 469, 510/488; 428/832, 848.9, 34.7; 134/3, 29, 134/40, 1, 2; 65/30.14; 427/128, 129, 427/398.1, 163.1; 360/135; 451/41, 56, 36; 216/22, 31
See application file for complete search history.

(56) References Cited

U.S. PATENT DOCUMENTS 3,669,893 A * 6/1972 Clarke et al. .................. 510/179
3,931,790 A * 1/1976 Franz ............................ 134/129

(Continued)

FOREIGN PATENT DOCUMENTS

| JP | 2006-089363 A | 4/2006 |
| JP | 2009-214219 A | 9/2009 |
| JP | 2010-086563 A | 4/2010 |

OTHER PUBLICATIONS

Translation Kao (JP 2010086563) Apr. 2010.*

*Primary Examiner* — Kevin M. Bernatz
(74) *Attorney, Agent, or Firm* — Sughrue Mion, PLLC

(57) ABSTRACT

An object of the invention is to remove effectively metallic contaminants adhering to the glass substrate surfaces without increasing roughness of the glass substrate surfaces in the glass substrate for a magnetic disk. In a manufacturing method of a glass substrate for a magnetic disk having a cleaning step of the glass substrate, the cleaning step comprising a cleaning treatment of contacting the glass substrate with an alkaline aqueous solution having a gluconate in concentration of not less than 0.05 wt % and not more than 2 wt % added thereto and a pH of not less than 9 and not more than 11 is appended.

6 Claims, 1 Drawing Sheet

(56) References Cited

U.S. PATENT DOCUMENTS

| | | | | |
|---|---|---|---|---|
| 4,268,554 A | * | 5/1981 | Gras | 428/34.7 |
| 4,540,444 A | * | 9/1985 | Kelly | 134/3 |
| 5,849,095 A | * | 12/1998 | Rouillard | 510/179 |
| 7,384,902 B2 | * | 6/2008 | Chernin et al. | 510/488 |
| 2006/0266732 A1 | * | 11/2006 | Marumo | 134/1 |
| 2007/0003796 A1 | * | 1/2007 | Isono et al. | 427/128 |
| 2007/0004322 A1 | * | 1/2007 | Ohashi et al. | 451/41 |
| 2008/0028793 A1 | | 2/2008 | Aida et al. | |
| 2009/0080066 A1 | * | 3/2009 | Muromachi et al. | 427/163.1 |
| 2009/0149363 A1 | * | 6/2009 | Smith et al. | 510/161 |
| 2009/0280241 A1 | * | 11/2009 | Iwata | 427/129 |
| 2010/0173820 A1 | * | 7/2010 | Smith et al. | 510/488 |
| 2010/0248593 A1 | * | 9/2010 | Sakai et al. | 451/36 |

\* cited by examiner

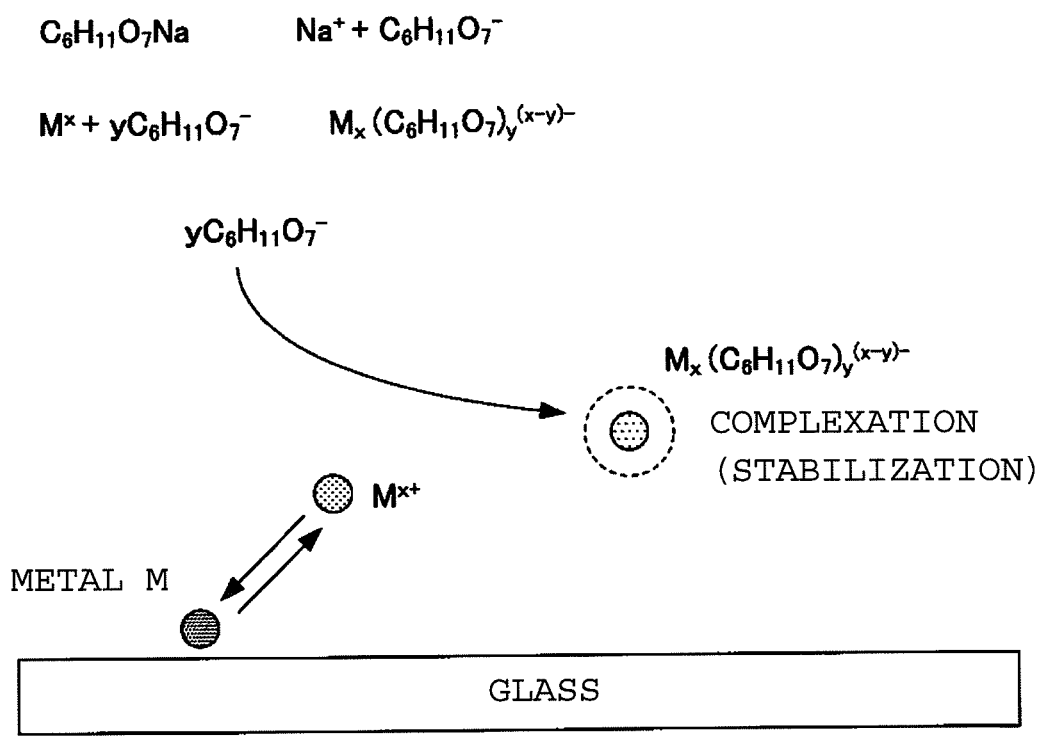

MANUFACTURING METHOD OF A GLASS SUBSTRATE FOR A MAGNETIC DISK

CROSS REFERENCE TO RELATED APPLICATIONS

This application is a National Stage of International Application No. PCT/JP2011/058325 filed Mar. 31, 2011, claiming priority based on Japanese Patent Application No. 2010-082453 filed Mar. 31, 2010, the contents of all of which are incorporated herein by reference in their entirety.

TECHNICAL FIELD

The present invention relates to a manufacturing method of a glass substrate for a magnetic disk.

BACKGROUND ART

With advancement of information technology, information recording technology, particularly magnetic recording technology, has progressed remarkably. In a magnetic disk used for an HDD (hard disk drive), which is one of the magnetic recording media, and so on, rapid miniaturization, production of thinner disk, increase in recording density and speedup of access rate have been continued. The HDD performs recording and playbacking while allowing a magnetic disk having a magnetic layer on a discal substrate to rotate at a high rate and allowing a magnetic head to fly floating above this magnetic disk.

Higher substrate strength is demanded for a magnetic disk since the rotary rate of the magnetic disk increases with the increase of access rate. In addition, with the increase of recording density, the magnetic head changes from a thin film head to a magnetoresistive head (MR head), further to a giant magnetoresistive head (GMR head), and the flying height from the magnetic disk of the magnetic head becomes narrower to around 8 nm. On this account, when there are irregularities on the magnetic disk surfaces, there may be caused crash failure due to collision of the magnetic head, thermal asperity failure which leads to read errors due to heat caused by adiabatic compression of the air or contact thereof. It becomes important to finish the main surfaces of the magnetic disk as an extremely smooth surface to suppress such troubles caused on the magnetic head.

Therefore, glass substrates have come to be used lately as substrates for a magnetic disk in place of conventional aluminum substrates. This is because the glass substrates consisting of glass, which is a rigid material, can be superior to the aluminum substrates consisting of a metal, which is a flexible material, in smoothness of the substrate surfaces, substrate strength and rigidness. The glass substrates used for these magnetic disks are produced by subjecting the main surfaces to grinding and polishing, etc. The grinding and polishing of the glass substrates can be performed by a method using a double-sided polishing apparatus having planet gear mechanism. In the planet gear mechanism, a glass substrate is sandwiched with upper and lower surface plates having abrasive pads (abrasive cloth) affixed thereto, and while an abrasion liquid in which abrasive grains (slurry) are mixed and suspended is supplied between the abrasive pads and the glass substrate, the glass substrate is moved relatively to the upper and lower surface plates thereby finishing the main surfaces of the glass substrate as surfaces having predetermined smoothness (for example, see Patent Document 1).

In addition, thin films (magnetic layers) of a several-nm level are formed on the glass substrate for a magnetic disk the surfaces of which have been smoothed by grinding and polishing, etc., thereby forming recording and playbacking trucks and so on. Therefore, in the manufacturing method of a glass substrate for a magnetic disk, it is an important assignment to remove even slight contamination on the glass substrate surfaces to keep clean the substrate surfaces as well as to achieve smoothing by grinding and polishing.

The glass substrate has also an aspect of a brittle material. Therefore, in the manufacturing method of a glass substrate for a magnetic disk, the glass substrate is dipped in a heated chemical strength liquid and lithium and sodium ions of the glass substrate surfaces layers are ion-exchanged respectively with sodium and potassium ions in the chemical strength liquid thereby forming compressive stress layers on the surface layers of the glass substrate so that they may be strengthened (glass strength step).

CITATION LIST

Patent Literature

[Patent Literature 1] Japanese Patent Laid-Open No. 2009-214219

SUMMARY OF INVENTION

Technical Problem

In the meantime, in the production steps of a glass substrate for a magnetic disk, there is a case wherein member(s) made of stainless steel is used for a grinding apparatus, a polishing apparatus as shown in Patent Document 1. In addition, there is a case wherein materials made of stainless steel are also used in the chemical strength step. In other words, metallic contaminant (particularly iron-based contaminant) caused by stainless steel from these apparatuses might occur and adhere to the glass substrate when production steps with apparatuses made of stainless steel are performed.

Pollution which would have an influence on the glass substrate, particularly contamination caused by sticking of fine metallic particles should be removed in the production steps of the glass substrate for magnetic recording disks since it will produce irregularities on the surfaces after the film formation of the magnetic layer, which then cause reduction of electrical characteristics such as recording and playback characteristic and yield of the product. Consideration on contaminants caused by the materials of the apparatuses becomes necessary when it is taken into consideration that the flying height from the magnetic disks of the magnetic head decreases more and more with the improvement of the recording density.

However, it is necessary to use acidic solutions having strong reactivity (for example, aqua regia) in order to remove these metallic contaminants since the metallic contaminants derived from stainless steels are hard to be corroded, and it is difficult to remove them with cleaning liquids such as acidic aqueous solutions or alkaline aqueous solutions which are generally used by cleaning step.

On the other hand, when an acidic solution having strong reactivity is used as a cleaning liquid, the surface of the glass substrate is affected, which causes a problem that surface roughness increases. Accordingly, cleaning treatment using a cleaning liquid which can be removed effectively the metallic contaminants strongly sticking onto the glass substrate and does not affect the glass substrate is demanded so as to improve smoothness and cleanness of the glass substrate surfaces still more.

In late years an HDD equipped with a DFH (Dynamic Flying Height) technique in the head has been developed to improve recording density still more. This technology enables to bring the head element part closer to the media surfaces than before so that magnetic spacing may be reduced, but in the meantime, it has been revealed that it is necessary to make smoother and cleaner the main surfaces of the magnetic disks having less defects such as contaminating substances more than before when the DFH head is used. It is supposed that this is caused by the fact that the head element part is affected even by disorder with a little surface irregularities or even by contact with contaminating substances since the DFH head mechanism does not decrease the flying height of the main body of the head so that the main body can approach the magnetic disk surface but pushes out only the region around the head element part so that the latter can approach the media surface. For example, in order to achieve recording density of more than 500 GB per one piece of 2.5-inch magnetic disk, it is demanded to make the gap between the pushed-out head element part and the magnetic disk not more than 1 nm.

The present invention has been accomplished in consideration of the above-mentioned problem, and an object thereof is to remove effectively metallic contaminants adhering to the glass substrate surfaces, without increasing roughness of the glass substrate surfaces in the glass substrate for a magnetic disk.

Solution to the Problems

The manufacturing method of a glass substrate for a magnetic disk of the present invention is a manufacturing method of a glass substrate for a magnetic disk comprising a cleaning step of the glass substrate wherein the cleaning step comprises a treatment of contacting the glass substrate with an alkaline aqueous solution having a gluconate in concentration of not less than 0.05 wt % and not more than 2 wt % added thereto and a pH of not less than 9 and not more than 11.

In the manufacturing method of a glass substrate for a magnetic disk of the present invention, it is preferable that the gluconate is sodium gluconate or potassium gluconate.

In the manufacturing method of a glass substrate for a magnetic disk of the present invention, it is preferable that the alkaline aqueous solution is potassium hydroxide or sodium hydroxide.

In the manufacturing method of a glass substrate for a magnetic disk of the present invention, iron-based metallic contaminant on the glass substrate is removed by contacting the glass substrate with an alkaline aqueous solution.

Technical Advantage of the Invention

According to one embodiment of the present invention, the metallic contaminants adhering to the glass substrate surfaces can be removed effectively without increasing roughness of the glass substrate surfaces.

BRIEF DESCRIPTION OF DRAWINGS

FIG. 1 is a schematic drawing illustrating the case wherein gluconate ion forms a complex with a iron-based metal.

DESCRIPTION OF EMBODIMENTS

In the following, embodiments of the present invention are described with drawings, working examples and so on. These drawings, working examples and descriptions exemplify the present invention and they do not limit the scope of the present invention. It goes without saying that the any other embodiments can belong to the scope of the present invention as far as they are compatible to the objects of the present invention.

The present inventors conducted studies in order to achieve further smoothness and improvement of cleanness of the glass substrate and they faced a problem that metallic contaminants (for example, iron-based contaminants) caused by materials in production apparatuses of a glass substrate for a magnetic disk adhered to the glass substrate and they could not be sufficiently removed with an ordinary cleaning treatment. Under the circumstances, as a result of intensive studies for a process for removing metallic contaminants from stainless steel without increasing surface roughness of the glass substrate, the present inventors found a process which could effectively remove metallic contaminants without affecting the surfaces of the glass substrate by adding an additive having excellent complex forming ability under a lower alkaline condition to the alkaline solution. Specifically, it has been found that metallic contaminants can be dissolved effectively by adding a gluconate to an alkaline solution and that reattachment to the glass substrate of the metallic contaminants which have been dissolved by generating a stable complex can be suppressed. In the following, specific examples of the manufacturing method of a glass substrate for a magnetic disk of the present invention are described.

The manufacturing method of a glass substrate for a magnetic disk illustrated in this embodiment has one of the characteristics in that a cleaning treatment step having a treatment of contacting the glass substrate with an aqueous solution which is made alkaline in the range of not increasing the surface roughness of the glass substrate surfaces and to which a gluconate is added is performed. Hereby metallic contaminants can be removed by generating a complex of a metal contained in the metallic contaminants adhering to the glass substrate with a gluconate ion. The surface roughness can be measured with an atomic force microscope.

More specifically, the manufacturing method of a glass substrate for a magnetic disk shown in this embodiment is characterized in that a cleaning step is performed which comprises a treatment of contacting the glass substrate with an alkaline aqueous solution having a gluconate in concentration of not less than 0.05 wt % and not more than 2 wt % added thereto and a pH of not less than 9 and not more than 11.

For gluconates, sodium gluconate or potassium gluconate can be used. Cleaning ability of a detergent or a solution can be improved by adding sodium gluconate to an alkaline detergent or an alkaline solution. In particular, as for metallic contaminants adhering to the glass substrate surfaces, reattachment of the metallic contaminants to the glass substrate after the metallic contaminants are dissolved can be suppressed by complexation of the removed metal.

Sodium gluconate dissociates as follows in water and can stably supply a gluconic acid group (gluconate ion) abundantly to water. Therefore, sufficient cleaning ability for fine contamination on the glass substrate can be expected even in addition of a very small amount of sodium gluconate. Furthermore, if the addition amount of sodium gluconate is very small, surface roughness of the glass substrate can be suppressed from growing.

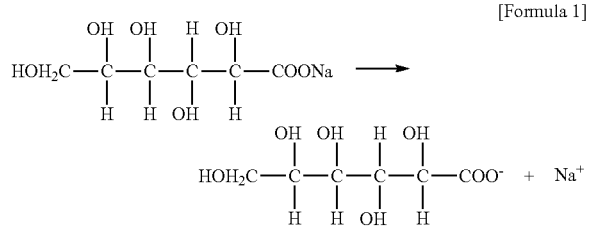

[Formula 1]

As for the alkaline solution (alkaline detergent) to which sodium gluconate is added, potassium hydroxide (KOH) and sodium hydroxide (NaOH) can be applied. In addition, the pH of an alkaline aqueous solution which functions as a cleaning liquid is adjusted to not less than 9 and not more than 11. When the pH is less than 9, metal contaminants on the glass substrate surfaces cannot be removed sufficiently and when the pH exceeds 11, roughness of the glass substrate surfaces increases.

It is preferable for the concentration of sodium gluconate in the cleaning liquid is set to not less than 0.05 wt % and not more than 2 wt %. When the concentration is less than 0.05 wt %, metal contaminants on the glass substrate surfaces cannot be sufficiently removed and when the concentration exceed 2 wt %, further effects cannot be obtained.

In the following, mechanism of removing the iron-based contaminants adhering to the glass substrate is explained.

The gluconate ion generated by Formula I stated above forms a complex with iron-based metals. In an alkaline solution as in the present invention, sodium gluconate has excellent complex forming ability with metals and can trap iron-based metals which have once dissolved in solution as a stable gluconic acid complex. It also forms a stable complex with an iron-based metal ion which has been already present due to the other factors in water. This suppresses reattachment to the glass substrate and can hereby prevent contamination (see FIG. 1).

In the following, respective steps of the manufacturing method of the substrate for a magnetic disk are described. It should be noted that the order of the respective steps may be appropriately exchanged.

(1) Material Processing Step and First Lapping Step

At first, sheet glass can be used in the material processing step. This sheet glass can be produced by well-known manufacturing methods including, for example, press method, float method, down-draw method, redraw method and fusion method using molten glass as a material. If the press method is used among these methods, sheet glass can be produced at a low cost.

In the first lapping step, both the main surfaces of the disk-shaped glass are subjected to lapping to mainly adjust flatness and board thickness of the glass substrate. The lapping can be carried out using a double-sided lapping machine employing a planetary gear mechanism with the use of alumina-based free abrasive grains. Specifically, the lapping is carried out by pressing lapping surface plates onto the both surfaces of the disk-shaped glass from the upper and lower sides, supplying a grinding fluid containing the free abrasive grains onto the main surfaces of the disk-shaped glass, and relatively moving to each other. By this lapping, the glass substrate having flat main surfaces can be obtained.

(2) Cutting-Out Step (Coring Step for Forming Opening, Chamfering Step (Chamfered Surface Forming Step) to Form Chamfered Surfaces at Peripheral Edge Regions (Outer Peripheral Edge Region and Inner Peripheral Edge Region))

In the coring step, an inner opening is formed at the center part of this glass substrate, for example, with a cylindrical diamond drill, thereby obtaining an annular glass substrate. In the chamfering step, grinding is applied to the outer peripheral edge face and inner peripheral edge face using diamond grindstones, thereby carrying out predetermined chamfering processing.

(3) Second Lapping Step

In the second lapping step, the second lapping is applied to both the main surfaces of the obtained glass substrate in the same manner as in the first lapping step. By performing this second lapping step, fine irregularities formed on the main surfaces, for example, in the cutting-out step as a previous step can be removed in advance. Consequently, it becomes possible to complete a subsequent main surface polishing step in a short time.

(4) Edge Face Polishing Step

In the edge face polishing step, the outer peripheral edge face and inner peripheral edge face of the glass substrate are mirror-polished by a brush polishing method. For this purpose, as polishing abrasive grains, a slurry (free abrasive grains) containing cerium oxide abrasive grains can be used. By this edge face polishing step, segregation of sodium and potassium can be prevented and the edge faces of the glass substrates are finished to a mirror surface state which can prevent the generation of particles, cause of thermal asperity and so on, and the adhesion thereof to the edge face regions.

(5) Main Surface Polishing Step (First Polishing Step)

The first polishing step is first carried out as a main surface polishing step. This first polishing step mainly aims to remove cracks or strains remaining on the main surfaces during the foregoing lapping step. In this first polishing step, the main surfaces are polished with a double-sided polishing machine having a planetary gear mechanism along with the use of a hard resin polisher. Cerium oxide abrasive grains may be used as a polishing agent. The glass substrate subjected to the first polishing step can be washed with a neutral detergent, pure water, IPA, etc.

(6) Chemical Strength Step

Chemical strength was applied to the glass substrate subjected to the foregoing lapping and polishing steps in the chemical strength step. As a chemical strength liquid used for chemical strength, for example, a mixed solution of potassium nitrate (60%) and sodium nitrate (40%) can be used. The chemical strength is performed by heating the chemical strength liquid to 300° C. to 400° C. and preheating the glass substrate for which cleaning is finished to 200° C. to 300° C. and dipping the substrate in the chemical strength solution for three hours to four hours. It is preferable that this dipping is performed in a state that plural glass substrates are held at the edge faces in a holder so that the whole of the both surfaces of the glass substrates are chemically strengthened.

Lithium and sodium ions in the surface layer of the glass substrates are respectively substituted with sodium and potassium ions having relatively larger radii in the chemical strength solution by performing a dipping treatment in the chemical strength solution in this way, thereby the glass substrates are strengthened. The chemically strengthened glass substrates are washed with pure water, IPA or the like after washed with sulfuric acid.

(7) Main Surface Polishing Step (Final Polishing Step)

Next, the second polishing step is carried out as a final surface polishing step. This second polishing step is a step aiming to finish both the main surfaces to mirror-like surfaces. In the second polishing step, both the main surfaces are mirror-polished with a double-sided polishing machine having a planetary gear mechanism along with the use of a soft foaming resin polisher. Cerium oxide abrasive grains, colloidal silica or the like which are finer than the cerium oxide abrasive grains used in the first polishing step may be used as a slurry.

(8) Cleaning Step

The glass substrate is subjected to cleaning step after the final polishing step. The cleaning step is a step aiming to remove particles adhering to the surface of the glass substrate due to the chemical strength step and the final polishing step.

For a cleaning step, cleaning treatment is performed by contacting the glass substrate with an alkaline aqueous solution having at least not less than 0.05 wt % and not more than 2 wt % of a gluconate in concentration added and a pH of not less than 9 and not more than 11. Specifically, the glass substrate is dipped in an alkaline aqueous solution to which sodium gluconate is added in sodium hydroxide as a cleaning liquid. The pH of the alkaline aqueous solution is adjusted to not less than 9 and not more than 11. This cleaning treatment enables to remove iron-based contaminants effectively derived from materials (stainless steel) of apparatuses adhering to the glass substrate surfaces without increasing surface roughness of the glass substrate. Besides, iron-based contaminants can be removed effectively by performing the above-mentioned cleaning step even if iron-based contaminants due to the chemical strength step adhere to the glass substrate so strongly. Above cleaning treatment becomes in particular effective when an apparatus to use for chemical strength step includes materials made of stainless steel.

The cleaning step may be performed in combination with the other cleaning treatments in addition to the above-mentioned treatment. For example, combination with acidic cleaning can impart secured removing effect for the metallic contaminants, which cannot be fully dissolved with either of acid and alkali.

Heretofore is shown a constitution to perform a cleaning step using a cleaning liquid in which a gluconate is added to an alkaline aqueous solution after the final polishing step, but it may be performed before the final polishing step or both before and after the final polishing step. For example, cleaning step using a cleaning liquid in which a gluconate is added to an alkaline aqueous solution can be performed after the first lapping step and/or the second lapping step.

<Step for Producing Magnetic Disks (Recording Layer and the Like Forming Step)>

Perpendicular magnetic recording disks can be produced by film-forming, for example, an adhesion layer, a soft magnetic layer, a nonmagnetic underlayer, a perpendicular magnetic recording layer, a protective layer and a lubricating layer sequentially on the main surfaces of the glass substrate for a magnetic disk obtained through the foregoing steps. Cr alloys and so on can be mentioned as materials constituting the adhesion layer. CoTaZr group alloys and so on can be mentioned as materials constituting the soft magnetic layer. A granular nonmagnetic layer and so on can be mentioned as the nonmagnetic underlayer. A granular magnetic layer and so on can be mentioned as the perpendicular magnetic recording layer. Hydrogenated carbons and so on can be mentioned as materials constituting a protective layer. Fluorine resins and so on can be mentioned as materials constituting the lubrication layer. For example, these recording layers and the like can be formed more specifically by film-forming an adhesion layer of CrTi, a soft magnetic layer of CoTaZr/Ru/CoTaZr, a nonmagnetic granular underlayer of $CoCrSiO_2$, a granular magnetic layer of $CoCrPt—SiO_2.TiO_2$ and a hydrogenated carbon protective layer sequentially with an in-line type sputtering apparatus and then film-forming a perfluoropolyether lubricating layer by dipping method on the glass substrate.

Here, a Ru underlayer may be used in substitution for the nonmagnetic granular underlayer of $CoCrSiO_2$. In addition, a seed layer of NiW may be added between the soft magnetic layer and the underlayer. A magnetic layer of CoCrPtB may be also added between the granular magnetic layer and the protective layer.

Next, examples performed for making clear the effects of the present invention are described.

EXAMPLES AND COMPARATIVE EXAMPLES (1) Material Processing Step

Molten aluminosilicate glass was formed into a disk shape by direct pressing using upper, lower, and drum molds, thereby obtaining an amorphous sheet glass. A glass which contains, as main components, $SiO_2$: 58 wt % to 75 wt %, $Al_2O_3$: wt % to 23 wt %, $Li_2O$: 3 wt % to 10 wt % and $Na_2O$: 4 wt % to 13 wt % was used as the aluminosilicate glass. Here, $Li_2O$ may be not less than 0 wt % and not more than 7 wt %.

(2) First Grinding (Lapping) Step

Then, both the main surfaces of the disk-shaped glass substrate were subjected to lapping. The lapping was carried out using a double-sided lapping machine employing a planetary gear mechanism with the use of alumina-based free abrasive grains. Specifically, the lapping was carried out by pressing lapping surface plates onto the both surfaces of the glass substrate from the upper and lower sides, supplying a grinding fluid containing the free abrasive grains onto the main surfaces of the sheet glass, and relatively moving them to carry out to the lapping. By this lapping, the glass substrate having flat main surfaces can be obtained.

(3) Cutting-Out Step (Coring, Chamfering)

Then, an inner opening was formed at the center part of this glass substrate with a cylindrical diamond drill, thereby obtaining an annular glass substrate (coring). And grinding was applied to the outer peripheral edge face and inner peripheral edge face using diamond grindstones, thereby carrying out predetermined chamfering processing (chamfering).

(4) Second Lapping Step

Then, the second lapping step was applied to both the main surfaces of the obtained glass substrate in the same manner as in the first lapping step. By performing this second lapping step, fine irregularities formed on the main surfaces in the cutting-out step or edge face polishing step as a previous step can be removed in advance. Consequently, it becomes possible to complete a subsequent main surface polishing step in a short time.

(5) Edge Face Polishing Step

Then, the outer peripheral edge face and inner peripheral edge face of the glass substrate were mirror-polished by a brush polishing method. For this purpose, as polishing abrasive grains, a slurry (free abrasive grains) containing cerium oxide abrasive grains were used. And the glass substrate for which the edge face polishing step was finished was water washed. By this edge face polishing step, the edge faces of the glass substrate were finished to a mirror surface state which could prevent the segregation of sodium and potassium.

(6) Main Surface Polishing Step (First Polishing Step)

The first polishing step was first carried out as a main surface polishing step. This first polishing step mainly aims to remove cracks or strains remaining on the main surfaces during the foregoing lapping step. In this first polishing step, the main surfaces were polished with a double-sided polishing machine having a planetary gear mechanism along with the use of a hard resin polisher. Cerium oxide abrasive grains were used as a polishing agent.

The glass substrate subjected to the first polishing step was washed by dipping the substrate sequentially in cleaning tanks respectively of a neutral detergent, pure water, IPA (Isopropyl alcohol).

(7) Chemical Strength Step

Then, chemical strength treatment (ion-exchange treatment) was applied to the glass substrate subjected to the main surface polishing step. A chemical strength solution in which potassium nitrate (60%) and sodium nitrate (40%) were mixed was prepared, and the chemical strength was performed by heating the chemical strength liquid to 400° C. and preheating the glass substrate for which cleaning is finished to 300° C. and dipping the substrate in the chemical strength solution for about three hours. This dipping was performed in a state that plural glass substrates were held at the edge faces in a holder so that the whole of the surfaces of the glass substrates might be chemically strengthened.

Lithium and sodium ions in the surface layer of the glass substrates were respectively substituted with sodium and potassium ions in the chemical strength solution by performing a dipping treatment in the chemical strength solution in this way, thereby the glass substrates were strengthened.

(8) Main Surface Polishing Step (Final Polishing Step)

Next, the second polishing step was carried out as a final surface polishing step. This second polishing step aims to perform polishing so as to reduce the predetermined film thickness corresponding to the compressive stress layer formed on the glass substrate and to finish the main surfaces to mirror-like surfaces. In this Example, the main surfaces are polished with a double-sided polishing machine having a planetary gear mechanism along with the use of a soft foaming resin polisher so as to mirror-polish the main surfaces. Colloidal silica abrasive grains (average particle size 5 nm to 80 nm) finer than the cerium oxide abrasive grains used in the first polishing step were used as a polishing agent.

(9) Cleaning Step

The glass substrates subjected to the chemical strength treatment were dipped and quenched in a water bath of 20° C. and maintained for about ten minutes. Then, after the final polishing step described above was applied to the quenched glass substrates, the substrates were dipped in an aqueous solution in which oxides of plural metals (Fe, Ni, Cr, Cu, Zn) were dispersed or partly dissolved to prepare pseudo contaminated substrates. These pseudo contaminated substrates were dipped in the cleaning liquids in which a gluconate was added to alkaline aqueous solutions of respective conditions shown in Table 1 to perform a cleaning treatment. The initial count of contaminating substances of the pseudo contaminated substrates was about 10,000 on average. The glass substrates for which cleaning was finished were dipped and washed in each cleaning tank of pure water and IPA sequentially.

(Defect Evaluation)

Defects were inspected for respective glass substrates obtained in Examples and Comparative Examples with an optical defect tester (product name OSA6100 produced by KLA-Tencor Company). As a measurement condition, the laser wavelength was 405 nm at a laser power of 25 mW with a laser spot diameter of 5 μm and an area between 15 mm to 31.5 mm from the center of the glass substrate was measured. Among the defects detected having a size less than 1.0 μm, the number (per 24 $cm^2$) of adhering defects was shown in Table 1. Here, the number of defects was measured by counting the number of the defects which remained in the same positions after the cleaning step while assuming the defects on the surface of the glass substrate before the cleaning step as a standard. The defects in these Examples refer to metallic contaminants (more specifically fine particles) sticking to the glass substrate surface.

(Surface Measurement of Glass Substrates)

The respective glass substrates obtained in Examples and Comparative Examples were measured with an atomic force microscope at a resolution of 256×256 pixels per 2 μm×2 μm and the surface roughness (arithmetical average roughness (Ra)) was determined. The results are shown in Table 1.

TABLE 1

| | Alkaline aqueous solution | Gluconate concentration (wt %) | pH | Number of defects | Surface roughness Ra (nm) |
| --- | --- | --- | --- | --- | --- |
| Example 1 | NaOH | Sodium gluconate 0.06 | 9.2 | 155 | 0.21 |
| Example 2 | NaOH | Sodium gluconate 1.1 | 9.2 | 143 | 0.20 |
| Example 3 | KOH | Sodium gluconate 1.9 | 9.2 | 167 | 0.20 |
| Comparative Example 1 | KOH | 0 | 9.2 | 285 | 0.21 |
| Reference Example 1 | NaOH | Sodium gluconate 2.2 | 9.2 | 170 | 0.20 |
| Example 4 | NaOH | Sodium gluconate 1.1 | 9.9 | 110 | 0.21 |
| Example 5 | KOH | Potassium gluconate 0.06 | 10.1 | 131 | 0.22 |
| Example 6 | NaOH | Sodium gluconate 1.1 | 10.1 | 108 | 0.22 |
| Example 7 | KOH | Potassium gluconate 1.9 | 10.1 | 130 | 0.22 |
| Comparative Example 2 | NaOH | 0 | 10.1 | 225 | 0.22 |
| Reference Example 2 | NaOH | Sodium gluconate 3.5 | 10.1 | 134 | 0.22 |
| Example 8 | KOH | Sodium gluconate 0.06 | 10.8 | 122 | 0.24 |
| Example 9 | KOH | Potassium gluconate 1.1 | 10.8 | 107 | 0.24 |
| Example 10 | NaOH | Potassium gluconate 1.9 | 10.8 | 110 | 0.24 |
| Comparative Example 3 | NaOH | 0 | 10.8 | 204 | 0.25 |
| Reference Example 3 | KOH | Potassium gluconate 2.6 | 10.8 | 125 | 0.24 |
| Comparative Example 4 | KOH | Sodium gluconate 0.06 | 8.8 | 330 | 0.20 |
| Comparative Example 5 | NaOH | Sodium gluconate 1.1 | 8.8 | 273 | 0.19 |
| Comparative Example 6 | KOH | Potassium gluconate 1.9 | 8.8 | 298 | 0.19 |
| Comparative Example 7 | NaOH | 0 | 8.8 | 342 | 0.20 |
| Comparative Example 8 | NaOH | Sodium gluconate 2.2 | 8.8 | 306 | 0.19 |

TABLE 1-continued

| | Alkaline aqueous solution | Gluconate concentration (wt %) | pH | Number of defects | Surface roughness Ra (nm) |
|---|---|---|---|---|---|
| Comparative Example 9 | NaOH | Potassium gluconate 0.06 | 11.3 | 113 | 0.27 |
| Comparative Example 10 | KOH | Sodium gluconate 1.1 | 11.3 | 102 | 0.26 |
| Comparative Example 11 | KOH | Potassium gluconate 1.9 | 11.3 | 105 | 0.26 |
| Comparative Example 12 | KOH | 0 | 11.3 | 186 | 0.27 |
| Comparative Example 13 | NaOH | Sodium gluconate 2.2 | 11.3 | 103 | 0.26 |

From Table 1, it was confirmed that the number of defects of the glass substrates was able to be reduced but surface roughness of the glass substrates increased in the case of using a cleaning liquid having a pH of more than 11 (Comparative Examples 9 to 13). Meanwhile, although the surface roughness of the glass substrates did not increase but there are a number of defects of the glass substrates and contaminating substances adhering to the glass substrates were not able to be removed sufficiently in the case of using a cleaning liquid having a pH of less than 9 (Comparative Examples 4 to 8). In addition, metallic contaminants adhering to the glass surfaces were able to be removed effectively without increasing the surface roughness of the glass substrates in the case of using a cleaning liquid having a pH of 9 to 11 to which an appropriate amount of gluconate is added (Examples, Reference Examples).

(DFH Touchdown Test)

Next, magnetic disks are prepared using the glass substrates for which a cleaning step was performed without newly performing pseudo-contamination in the conditions of Examples 2, 4, 6, 9 and Comparative Examples 5, 10 shown in Table 1 mentioned above and a touchdown test of a DFH head element part was performed using an HDF tester (Head/Disk Flyability Tester) produced by Kubota Comps Corporation. This test slowly pushes out the element part by DFH mechanism and evaluates the distance when the head element part contacts with the magnetic disk surface by detecting the contact with the magnetic disk surface by way of an AE sensor. The head used was a DFH head for 320 GB/P magnetic disks (2.5 inch size). The flying height when the element part is not pushed out is 10 nm. The other conditions were set as follows.

Magnetic disk: 2.5-inch glass substrates (20 mm in inside diameter, 65 mm in outside diameter, 0.8 mm in board thickness) were produced and a recording layer and the like were film-formed on the glass substrates.
Evaluation radius: 22 mm
Number of revolutions of the magnetic disk: 5400 RPM
Temperature: 25° C.
Humidity: 60%

The film formation of the recording layer on the glass substrate was performed as follows. At first, the film formation apparatus was drawn to vacuum, and adhesion layer/soft magnetic layer/pre-underlayer/underlayer/main recording layer/auxiliary recording layer/protective layer/lubrication layer were sequentially film-formed on the substrate in an Ar atmosphere by DC magnetron sputtering method. The Ar gas-pressure at the time of the film formation was 0.6 Pa unless otherwise indicated. As the adhesion layer, Cr-50Ti was film-formed to 10 nm. As the soft magnetic layer, 92Co-3Ta-5Zr was film-formed respectively to 20 nm sandwiching a 0.7-nm Ru layer. As the pre-underlayer, Ni-5W was film-formed to 8 nm. As the underlayer, Ru was film-formed to 10 nm at 0.6 Pa and Ru was film-formed to 10 nm at 5 Pa thereon. As the main recording layer, 90 (72Co-10Cr-18Pt)-5 $(SiO_2)$-5 $(TiO_2)$ was film-formed to 15 nm at 3 Pa. As the auxiliary recording layer, 62Co-18Cr-15Pt-5B was film-formed to 6 nm. As the protective layer, $C_2H_4$ was film-formed to 4 nm by CVD method and the surface layer was subjected to nitriding treatment. As the lubrication layer, PFPE was formed to 1 nm by a dip coating method.

Results of the DFH touchdown test are shown in Table 2. Here in Table 2, evaluation was made as follows depending on the distance (assuming this as x) at which the head element part and the magnetic disk contacted.

⊚: x≤0.9 nm
◯: 0.9 nm<x≤1.0 nm
Δ: 1.0 nm<x

TABLE 2

| | Alkaline aqueous solution | Gluconate concentration (wt %) | pH | DFH pushing-out test |
|---|---|---|---|---|
| Example 11 | NaOH | Sodium gluconate 1.1 | 9.2 | ⊚ |
| Example 12 | NaOH | Sodium gluconate 1.1 | 9.9 | ⊚ |
| Example 13 | NaOH | Sodium gluconate 1.1 | 10.1 | ◯ |
| Example 14 | KOH | Potassium gluconate 1.1 | 10.8 | ◯ |
| Comparative Example 14 | NaOH | Sodium gluconate 1.1 | 8.8 | Δ |
| Comparative Example 15 | KOH | Sodium gluconate 1.1 | 11.3 | Δ |

From Table 2, the distance at which the head element part and the magnetic disk contacted was able to be reduced to as low as not more than 1.0 nm in Examples 11 to 14. In particular, the distance at which the head element part and the magnetic disk contacted was able to be further reduced in Examples 11 and 12. On this account it may be said that it is more preferable to set the pH of the cleaning liquid to not less than 9 and not more than 10. On the other hand, the distance at which the head element part and the magnetic disk contacted was more than 1.0 nm and was not able to be reduced to not more than 1.0 nm in Comparative Examples 14, 15.

In addition, from Table 1 and Table 2 mentioned above, the surface roughness of the glass substrates is preferably less than 0.26 nm, more preferably 0.24 nm and still more preferably not more than 0.21 nm. Besides, the number of defects of the glass substrate is preferably less than 204, and more preferably not more than 170.

The present invention is not limited to the embodiments mentioned above and can be carried out with appropriate modification. For example, materials, size, treatment procedure, inspection procedure in the embodiments mentioned above are examples and the invention can be carried out with various modifications within the scope in which the effects of the present invention are exhibited. In addition, the invention can be carried out with appropriate modifications as long as they do not deviate from the scope of objects of the present invention.

The present application is based on Japanese Patent Application No. 2010-082453 filed on Mar. 31, 2010. The contents thereof are entirely incorporated herein.

The invention claimed is:

1. A manufacturing method of a glass substrate for a magnetic disk mounted on a hard disk drive equipped with a DFH head, the manufacturing method comprising a cleaning step of the glass substrate and a polishing step that is performed prior to the cleaning step, wherein the cleaning step comprises a treatment of contacting the glass substrate with an alkaline aqueous solution having a gluconate in concentration of not less than 0.05 wt % and not more than 2 wt % added thereto and a pH of not less than 9 and not more than 11 to remove metallic contaminants adhering to the glass substrate.

2. The manufacturing method of a glass substrate for a magnetic disk according to claim 1, wherein the gluconate is sodium gluconate or potassium gluconate.

3. The manufacturing method of a glass substrate for a magnetic disk according to claim 1, wherein the alkaline aqueous solution is potassium hydroxide or sodium hydroxide.

4. The manufacturing method of a glass substrate for a magnetic disk from according to claim 1, wherein iron-based metallic contaminants on the glass substrate are removed by contacting the glass substrate with the alkaline aqueous solution.

5. The manufacturing method of a glass substrate for a magnetic disk according to claim 1, wherein the cleaning step is a step of cleaning the glass substrate which has been subjected to chemical strength.

6. The manufacturing method of a glass substrate for a magnetic disk according to claim 5, wherein the glass substrate is subjected to chemical strength with a chemical strength apparatus containing materials made of stainless steel.

\* \* \* \* \*